(12) United States Patent
Liu

(10) Patent No.: US 10,411,628 B2
(45) Date of Patent: Sep. 10, 2019

(54) SERVO CONTROL STRATEGY AND SYSTEM FOR SIMULTANEOUSLY ELIMINATING COUNTER- ELECTROMAGNETIC FORCE (CEMF) AND LOAD TORQUE DISTURBANCES

(71) Applicant: SHANDONG UNIVERSITY, Jinan, Shandong (CN)

(72) Inventor: Jinbo Liu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 16/304,622

(22) PCT Filed: Jan. 16, 2017

(86) PCT No.: PCT/CN2017/071270
§ 371 (c)(1),
(2) Date: Nov. 26, 2018

(87) PCT Pub. No.: WO2018/120323
PCT Pub. Date: Jul. 5, 2018

(65) Prior Publication Data
US 2019/0222155 A1    Jul. 18, 2019

(30) Foreign Application Priority Data
Dec. 27, 2016    (CN) .......................... 2016 1 1224504

(51) Int. Cl.
*H02P 8/12*      (2006.01)
*H02P 21/13*     (2006.01)
(Continued)

(52) U.S. Cl.
CPC ............ *H02P 21/0017* (2013.01); *H02P 8/12* (2013.01); *H02P 21/13* (2013.01); *H02P 21/14* (2013.01)

(58) Field of Classification Search
USPC ....................................................... 318/685
See application file for complete search history.

(56) References Cited

U.S. PATENT DOCUMENTS

2003/0025475 A1* 2/2003 Won ...................... H02P 25/089
                                                          318/701
2004/0206571 A1* 10/2004 Nishizaki ............. B62D 5/0472
                                                          180/446
(Continued)

FOREIGN PATENT DOCUMENTS

| CN | 104052363 A | 9/2014 |
| CN | 105577058 A | 5/2016 |
| CN | 106026822 A | 10/2016 |

OTHER PUBLICATIONS

Xia, Cunjian, "Research of Servo Control Algorithm for Permanent Magnet Synchronous Motor based on Extended State Observer," Wanfang Data, 2010.
(Continued)

*Primary Examiner* — Jorge L Carrasquillo
(74) *Attorney, Agent, or Firm* — Oliff PLC

(57) ABSTRACT

A servo control strategy and system eliminates CEMF and load torque disturbances. The total disturbance at electrical portion is estimated using extended state observer based on a nominal model of armature winding with measured voltage impressed across two endpoints of armature winding and the measured armature current. The total disturbance at electrical portion is partially counteracted by feed-forward compensation. The remaining CEMF disturbance is eliminated with the aid of armature current feedback regulation. The electrical disturbance can be totally eliminated at inner loop of the system by combining feed-forward control with current feedback control. The total disturbance at mechanical portion is estimated using extended state observer based on a nominal model of drive system with measured armature
(Continued)

current and actual speed. The total disturbance at mechanical portion is partially counteracted by feed-forward compensation. The remaining load torque disturbance is eliminated with the aid of feedback regulation of speed.

9 Claims, 4 Drawing Sheets

(51) Int. Cl.
    *H02P 21/14*     (2016.01)
    *H02P 21/00*     (2016.01)

(56) References Cited

U.S. PATENT DOCUMENTS

| | | | |
|---|---|---|---|
| 2007/0069675 A1* | 3/2007 | MacKay | H02P 6/182 318/400.21 |
| 2014/0195013 A1 | 7/2014 | Gao et al. | |
| 2017/0077850 A1* | 3/2017 | Hamada | H02P 6/182 |
| 2017/0373618 A1* | 12/2017 | Miyazawa | H02P 6/28 |

OTHER PUBLICATIONS

Sep. 30, 2017 International Search Report issued in International Patent Application No. PCT/CN2017/071270.

Translation of Sep. 30, 2017 International Search Report issued in International Patent Application No. PCT/CN2017/071270.

May 4, 2018 Office Action issued in Chinese Patent Application No. 201611224504.7.

Yang Qiao Ling; "The Research of Auto-disturbances-rejection Control System of BLDCM"; B.E. (NouthEast Electric Power Institute) 2001 A Thesis submitted in partial satisfaction of the Requirement for the degree of Master of Science in College of Electrical Information Engineering in the Graduate School of Lan Zhou University of Technology, Jun. 2008.

* cited by examiner

SERVO CONTROL STRATEGY AND SYSTEM FOR SIMULTANEOUSLY ELIMINATING COUNTER- ELECTROMAGNETIC FORCE (CEMF) AND LOAD TORQUE DISTURBANCES

FIELD OF THE INVENTION

The present invention relates to a servo control strategy and system for simultaneously eliminating counter electromagnetic force (CEMF) and load torque disturbances.

BACKGROUND OF THE INVENTION

Servo control technology is widely used in the fields of robots, high speed rails, electric vehicles, numerical control machine tools, aviation, aerospace, etc. In order to obtain a high-performance closed-loop servo control system, following two basic problems have to be solved: (1) how to obtain feedback information necessary for a closed loop control; and (2) how to design a control strategy or algorithm to meet the requirement for servo control system.

For the former, in terms of servo system, the required feedback information relates to current, voltage, speed, position, etc., wherein the current (or voltage) information can be directly measured by Hall sensor or shunt resistance The position information can be directly detected by means of sensor such as tachogenerator, encoder or resolver. The speed information is usually acquired indirectly through difference of position information. Of course, in some occasions, the position information may also be obtained indirectly using observer technology through measured current and applied voltage to realize so-called position-sensorless scheme.

For the latter, the most widely applied control algorithm in practical servo control system is still PID-based control strategy. In addition, linear control strategy including pole configuration, zero-pole points cancellation and other non-linear control strategies such as sliding mode variable structure strategy using switching control, model reference adaptive control (MRAC) strategy based on reference model, etc.

It should be noted that PID control has following advantages: (1) good tracking ability for the step input; (2) good steady state performance with zero static deviation; and (3) low susceptibility under disturbance in the loop. However, PID control strategy is only suitable for linear objects or non-linear objects with little variation around operating point. Once the disturbance is too large, the operating point varies widely or the controlled object has too much degree of non-linearity exists, the PID control strategy fails to work properly. Besides, since PID control algorithm is built based on model, it is helpless for unmodeled dynamics.

Although sliding mode variable structure control strategy can be applied to non-linear objects and results in fast dynamic response and also robustness to variation of structure parameters, but there exist chattering problem due to delay in actual switching and control cycle.

MRAC is robust to variation of structure parameters, but dynamic performance in drive system becomes worse and thus has certain limitations in its application.

High-performance servo control system implemented with excellent control algorithm has following features: (1) good dynamic and steady-state performance; (2) wide adjustable speed range; (3) strong robustness to various disturbances; (4) insensitivity to variation of structural parameters; and (5) immunity to unmodeled dynamics and other non-linear factors.

With the development of technology, more and more equipment have higher need in performance of servo system. Existing control algorithms have difficulty in further meeting these high-performance requirements.

PID control parameters of a current loop in classic servo control scheme are designed according to resistance and inductance parameters of armature (or stator) winding without considering the influence of CEMF; PID control parameters in a speed loop are determined according to inertia of driving system and damping coefficient without considering the influence of load torque; typically, these systems take CEMF of the armature winding and the load torque as disturbances. These disturbances are partly eliminated by means of PID control strategy.

However, in practical situation, when the driving system operates at high speed or its speed changes greatly, the CEMF occupies a large proportion among the entire input voltage. Similarly, when the load torque is large or varies greatly, the load torque becomes dominant among the whole electromagnetic torque. How to deal with these two disturbances is still a challenge in order to improve performance of the servo system.

Through a comprehensive analysis on the existing servo system, the following problems can be found:

(1) Existing scheme has not taken the influence of the CEMF disturbance and the load torque disturbance into account simultaneously, and they are treated separately. So far, servo system schemes available basically adopt a single feed-forward compensation, which either counteract influence of the CEMF by adding a CEMF feed-forward term related to the speed, or counteract influence of the load torque by providing a feed-forward control using detection (or observation) result of the load torque.

(2) Existing schemes have not considered the variations in all electrical parameters (such as resistance, inductance) of the controlled motor (including DC, AC asynchronous and synchronous as well as permanent magnet brushless motors, etc.) and mechanical parameters (such as rotational inertia, stick-slip damping coefficient) of the driving system;

(3) In the existing schemes, disturbance information is mostly acquired by a disturbance observer. Such observer either estimates the load torque or the CEMF itself by using inverse model of the mechanical or electrical portion of the driving system, and then eliminates single disturbance by feed-forward control. Once unknown disturbances are included and model parameters vary, this type of disturbance compensation scheme is greatly discounted. Moreover, since there are unmodeled dynamics at electrical and mechanical portions and other non-linear factors (such as influence of saturation non-linearity on inductance parameters, influence of non-linearity of dynamic and static frictions on load torque, etc.), the conventional disturbance observer has no ability to take all these factors into account in actual motion control system;

(4) Up to now, there have been some schemes which estimate the load torque or CEMF disturbance by extended state observer instead of conventional disturbance observer. It should be noted that such scheme indeed take the influence of unmodeled dynamics, variation in parameters of the drive system and the like into account, and can estimate the variable CEMF or load torque. However, there has been no scheme, so far, which can estimate load torque and CEMF disturbances simultaneously by two extended state observers.

SUMMARY OF THE INVENTION

In view of the above problems, the present invention proposes a servo control strategy and system which can eliminate CEMF and load torque disturbances simultaneously. This invention can quickly eliminate CEMF disturbance caused by different speeds at electrical portion (i.e., winding) of motor through an inner loop, and at the same time, eliminate the load torque disturbance caused by load and load variation at mechanical portion through outer loop.

The basic idea of the present invention is: considering the fact that disturbances at electrical portion and the mechanical portion belong to different time scales respectively, the former varies fast and the latter does slowly, different disturbance estimation and control schemes must be used to eliminate influence of disturbances for CEMF and load torque, respectively. Therefore, according to the conventional cascade control system structure, a new set of servo control scheme and system based on extended state observers are established.

The details are as follows:

For the electrical portion, a state space model of armature winding including CEMF is established. An extended state space model describing electrical portion is established using above model in combination with feature of the CEMF.

First extended state observer for estimating CEMF is designed using structure of the extended state space model and nominal values of structure parameters of armature winding. The first extended state observer ultimately obtains information of all electrical disturbances including CEMF by using the measured voltage impressed at two endpoints of armature winding, measured armature current and nominal model.

An inner control loop of the system is established based on the measured current information and the first extended state observer. In the inner control loop, the current is regulated with feedback control, while the CEMF disturbance is eliminated by a feed-forward control. Specific solution is: the deviation of a given armature current from the actual one is sent to a current regulator. The current regulator may be an anti-integral saturation PI type controller. Output of the current regulator is added to the CEMF estimated from the first extended state observer, the sum of which is utilized as a given value of the armature voltage.

The above current regulator adopts an anti-integral saturation PI type controller, and the part of CEMF disturbance which has not been cancelled with the feed-forward compensation is then totally eliminated using robustness of PI controller. It should be noted that those skilled in the art are fully capable of replacing the anti-saturation PI type current controller with other robust regulation controllers, such as model prediction controller (MPC), dead-beat controller, pole configuration controller and MRAC, under enlightenment of working principle of the present invention, and such replacements are all simple replacements and improvements. These replacements and improvements are also intended to fall within the scope of the present invention.

The above first extended state observer uses nominal values of the structure parameters of armature winding, instead of true values. The first extended state observer is utilized without considering variation of the structural parameters (motor stator winding resistance, armature inductance) at electrical portion and robustness of control strategy. This means that even if the armature inductance varies due to magnetic saturation or armature winding resistance changes with temperature, performance of the system still remains unchangeable. Of course, it is a simple replacement without any creative effort for those skilled in the art under enlightenment of working principle of the present invention that the nominal values are replaced with other values.

For the mechanical portion, a state space model of the drive system is built firstly. An extended state space model describing the mechanical portion is established using the above model in combination with feature of the load torque.

A second extended state observer for estimating load torque is designed using structure of the extended state space model and nominal values of structural parameters at mechanical portion. The second extended state observer ultimately acquires information of all mechanical disturbances including load torque by using the measured armature current, rotor speed information from encoder or rotary resolver, and a nominal model.

Outer control loop of the system is established based on the detected rotor speed information and the second extended state observer. In the outer control loop, the rotor speed is regulated with feedback control, while load torque disturbance is eliminated by a feed-forward control. Specific solution is: the deviation of a given speed from the actual one is sent to a speed regulator. The speed regulator may be an anti-integral saturation PI type controller. Output of the speed regulator is added to the equivalent current converted from the estimated value of load torque disturbance, the sum of which is used as a given value of the armature current.

The speed regulator is also an anti-integral saturation PI type controller, and part of the load torque disturbance which has not been cancelled by feed-forward control is eliminated using robustness of the PI controller. Of course, those skilled in the art are fully capable of replacing the PI controller with other speed regulators, such as MPC, a dead-beat controller, a pole configuration controller and MRAC, under enlightenment of the working principle of the present invention, and such replacements are all simple replacements and improvements. These replacements and improvements are also intended to fall within the scope of the present invention.

The above second extended state observer uses nominal values of the structural parameters at mechanical drive portion, instead of true values. The second extended state observer is utilized without considering variation of the structural parameters at mechanical portion (the total inertia of drive system and stick-slip damping coefficient) and the robustness of the control strategy. This means that even if the total inertia of the drive system and stick-slip damping coefficient varies, performance of the system still remains unchangeable. Of course, it is a simple replacement without any creative effort for those skilled in the art under enlightenment of the working principle of the present invention that the nominal values are replaced with other values.

The aforementioned cascade servo control system capable of eliminating the influence of the inner loop CEMF and outer loop load torque disturbances simultaneously includes an inner feedback loop and an outer feedback loop, and the inner control loop includes a current regulator and a first extended state observer. The first extended state observer determines the total disturbance at electrical portion based on a nominal value model of armature winding according to the voltage applied to two endpoints of the armature and the measured armature current, and performs feed-forward compensation in combination with regulation of armature current by the current regulator to eliminate the total disturbance of CEMF;

The outer feedback loop includes a speed regulator and a second extended state observer, and the second extended state observer estimates total disturbance at mechanical portion based on nominal value model of the drive system according to measured armature current and actual speed information, and performs feed-forward compensation in combination with regulation of speed by the speed regulator to eliminate total disturbance of the load torque.

The influence of CEMF in the inner loop and load torque disturbances in the outer loop are eliminated simultaneously with the aid of inner and outer control loops.

Nominal value model of the armature winding is obtained from nominal values of armature inductance and resistance.

Nominal value model of the mechanical drive system is obtained from the nominal values of total inertia of the drive system and stick-slip damping coefficient.

Control parameters of the first extended state observer are determined according to the desired cutoff frequency of current loop, the armature inductance and resistance.

Control parameters of the second extended state observer are determined according to the desired cutoff frequency of speed loop, total inertia of the drive system and stick-slip damping coefficient.

It should be noted that the present invention is widely applicable, and all AC servo systems using vector control can use method or system of the present invention. Therefore, it is a simple replacement without any creative effort for those skilled in the art under enlightenment of working principle of the present invention that the method or system of the present invention is applied to a servo system (including a position servo or speed servo system) composed of an induction motor, a permanent magnet brushless DC motor and a permanent magnet synchronous motor.

The present invention has following benefits:

(1) The present invention can solve the problem that conventional disturbance observer exists due to inaccuracy and variation of system structural parameters (e.g., variation of the inertia of the load torque and the damping coefficient);

(2) There are no such problems as chattering and steady-state deviation in sliding mode variable structure control and limitations in MRAC scheme. The extended state disturbance observer take CEMF and load torque as well as perturbation of the parameters into account, thereby avoiding influence of variation in parameters of the motor and drive system on conventional disturbance observer, and therefore greatly improving overall performance of the system, including dynamic and steady-state performance of the system, robustness to grid voltage fluctuations and load disturbances, and parameter perturbation;

(3) The present invention estimates and compensates the CEMF and load torque disturbances using two individual extended state observers, thereby eliminating the disturbances at two different time scales (or at different bandwidths), and further improving the disturbance rejection capability and dynamic and steady-state performance of the servo system;

(4) Different from single conventional disturbance rejection scheme, the present invention separates the electrical disturbance including CEMF at electrical portion from the mechanical disturbance including load torque at mechanical portion, and uses a cascade control structure for eliminating the electrical disturbance at inner loop and mechanical disturbance at outer loop. In combination with two extended state observers of CEMF and load torque disturbances, a servo control strategy is realized for the first time which can eliminate the inner loop disturbance including CEMF and its variation and the outer loop disturbance including load torque and its variation simultaneously;

(5) The servo control system recited in the present invention is robust to the variations in resistance of the motor winding (temperature influence), inductance (saturation influence) and load torque, and also has certain robustness to non-linear factors such as unmodeled dynamics including dynamic and static frictions. Even for large disturbances, it still has strong robustness;

(6) The present invention has wide application, all AC servo systems using vector control, such as robot operation controls, numerical control machine tools (CNC) and drone servo drives, can use method or system of the present invention.

DETAILED DESCRIPTION OF THE EMBODIMENTS

Following is the detailed description of this present invention with illustrations and drawings.

(1) The conventional CEMF disturbance observer estimates CEMF using inverse model of electrical portion of the system, which has the disadvantage that variation of parameters (armature inductance, winding resistance) may affect estimation accuracy of the CEMF. Different from conventional disturbance observer, which estimates CEMF only, an extended state observer (ESO) ESO1 based on state space model of electrical portion is used in the present invention to observe all disturbances at electrical portion, including CEMF. The system block diagram is shown in FIG. 1.

Figure 1:
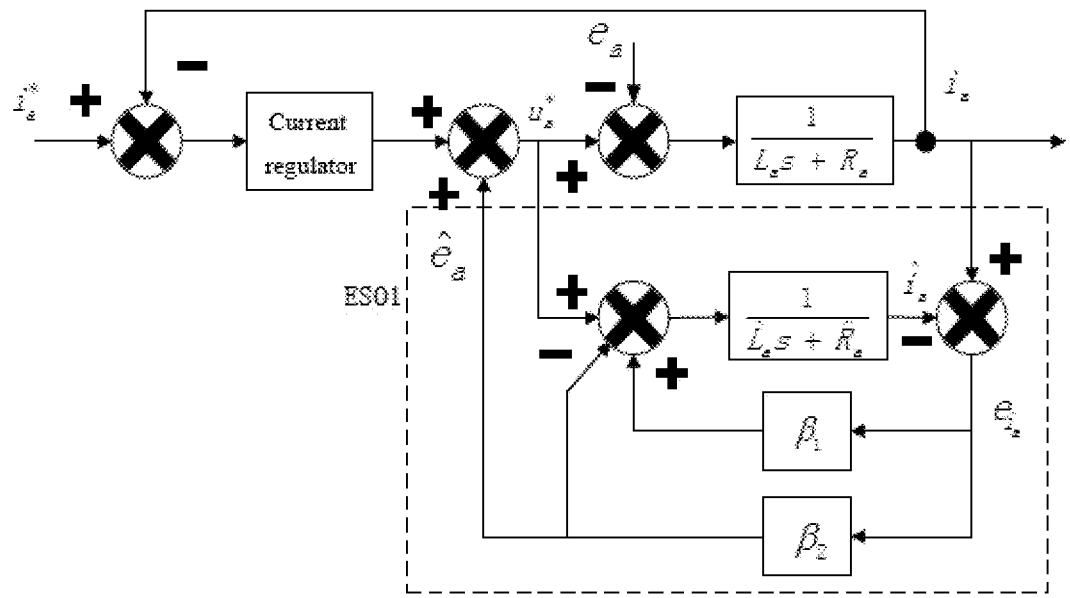
FIG. 1 is the block diagram of current inner loop control strategy according to the present invention.

In FIG. 1, the dashed box shows the ESO1 for estimating total disturbance at electrical portion including CEMF, which uses nominal model of armature winding (wherein, $\hat{L}_s$ and $\hat{R}_s$ are nominal values of armature inductance and resistance, respectively), and its state space model is described in section 3.1. $\beta_1$ and $\beta_2$ are coefficients of the ESO1. The ESO1 observes total disturbance $\hat{e}_a$ at electrical portion (besides CEMF, other disturbances of the electrical portion are also reflected in the $\hat{e}_a$) based on voltage u a applied to two endpoints of armature and actual current $i_a$ in armature windings obtained by a current sensors. Detailed design scheme of the ESO1 is shown in section 3.1.

In FIG. 1, current is regulated with a feedback control, while CEMF disturbance is eliminated by means of feed-forward control. Specific control scheme is introduced as follows:

Deviation of a given current $i^*_a$ from actual armature current $i_a$ is sent to the input of the current regulator, which may be an anti-integral saturation PI type controller. Output of the current regulator is added to the estimated CEMF value from the ESO1 to obtain a desired value $u^*_a$ of armature voltage, thereby eliminating most of the CEMF disturbance $e_a$ by means of feed-forward control. The remained disturbance, which is numerically small, can be eliminated using property of the PI controller in the loop.

It should be noted that the ESO1 in FIG. 1 adopts nominal values of motor stator winding parameters (La, Ra), instead of true values. This means that even if these parameters vary due to magnetic saturation or temperature, performance of the system remains unchangeable.

(2) Conventional torque disturbance observer estimates load torque using inverse model of the system, which has disadvantage that variation of system parameters (rotational inertia, damping coefficient, etc.) may affect estimation accuracy of the load torque. Different from the conventional disturbance observer, which estimates load torque only, an ESO2 based on a state space model at mechanical portion is utilized in the present invention to observe all disturbances, including load torque information at mechanical portion (besides the load torque, other disturbance at the mechanical portion are also reflected in $\hat{T}_L$). The system block diagram is shown in FIG. 2.

Figure 2:
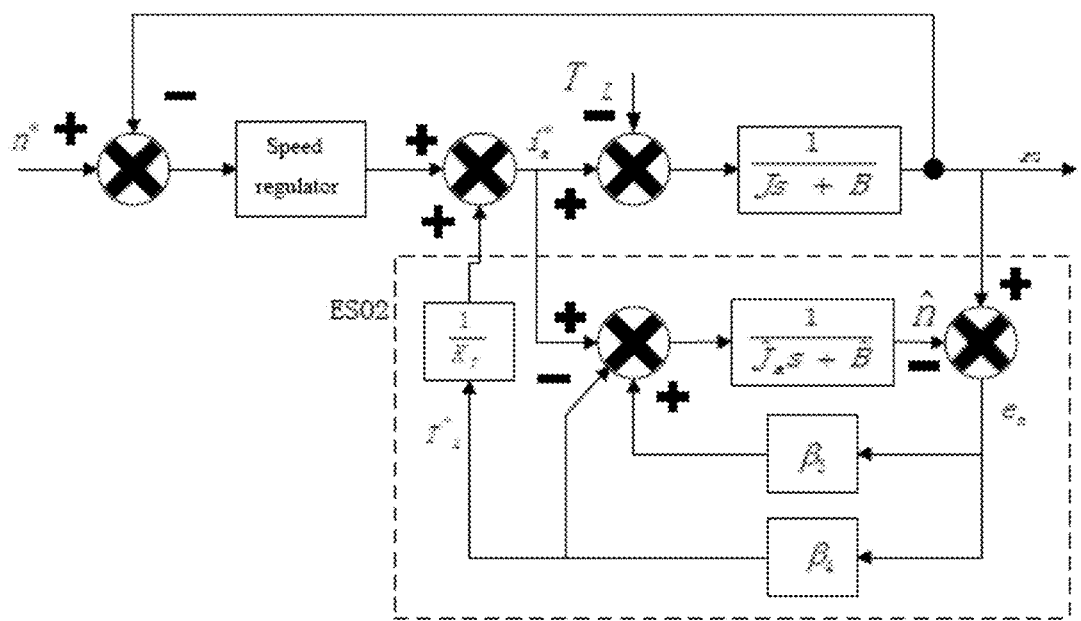
FIG. 2 is the block diagram of speed outer loop control strategy according to the present invention.

In FIG. 2, the dashed box shows ESO2 for estimating the total disturbance (including a load torque) of the mechanical portion, which uses nominal model of the drive system (wherein, $\hat{J}$ and $\hat{B}$ are nominal values of total inertia of the drive system and stick-slip damping coefficient), and its state-space model is described in section 3.2. $\beta_3$ and $\beta_4$ are coefficients of the ESO2, and $K_T$ is a torque coefficient. The ESO2 observes i total disturbance $\hat{T}_L$ at mechanical portion based on the applied armature current $i^*_a$ and actual speed n (obtained through encoder or rotary resolver installed at motor shaft). Detailed design scheme of the ESO2 is shown in section 3.2.

In FIG. 2, the speed is regulated with feedback control, while the load torque disturbance is eliminated by feed-forward compensation. The specific control scheme is introduced as follows:

Deviation of a given speed n* from actual speed n is sent to the input of speed regulator, which may be an anti-integral saturation PI type controller. Output of the speed regulator is added to a equivalent current (derived from $\hat{T}_L$ dividing by $K_T$) converted from the estimated load torque disturbance $\hat{T}_L$ with the ESO2 to obtain a desired value $i^*_a$ of the armature current, thereby eliminating most of the load torque disturbance $T_L$ by means of the feed-forward control. The remained disturbance, which is numerically small, can be then eliminated using property of the PI controller in the loop.

It should be noted that the ESO2 in FIG. 2 utilized nominal values of mechanical parameters (J, B) of the drive system, instead of true values. This means that even if these parameters vary due to load changes, performance of the system remains unchangeable. As for the speed regulator, other control schemes with certain robustness can also be used.

Figure 3:
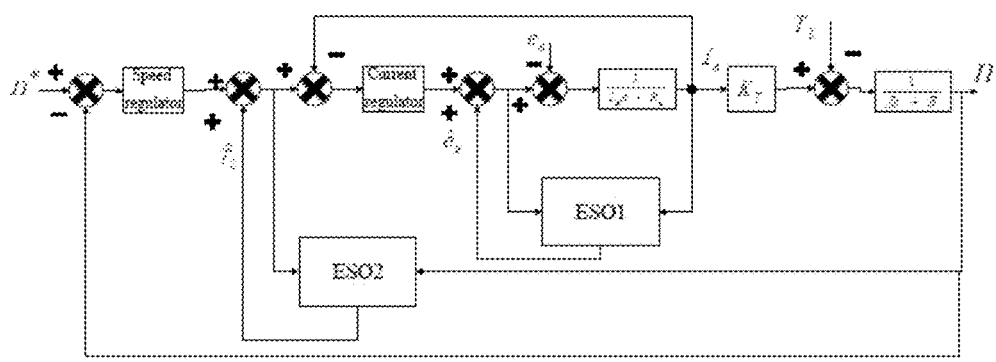
FIG. 3 is overall block diagram of the system according to the present invention.

All disturbance terms (including CEMF and load torque) are estimated using above two types of ESOs, and are counteracted by feed-forward compensation. The remaining non-counteracted disturbances are then eliminated by means of robustness of the inner and outer loop PI regulators themselves; thereby the system can handle quickly the disturbances at electrical and mechanical portions, respectively. Overall performance of the system may be improved. The overall block diagram of the system is shown in FIG. 3. The speed and current regulator in FIG. 3 can be either a somewhat robust PI type regulator or other robust control scheme.

(3) Design procedure and parameter selection for the extended state observers ESO1 and ESO2:

Parameters of the extended state observers ESO1 and ESO2 in FIGS. 1 and 2 can be selected using state space models at electrical and mechanical portions, respectively, according to pole configuration scheme. Specific process is introduced as follows:

3.1 Design of the Extended State Observer (ESO1) for Estimating Total Disturbance Including CEMF at Electrical Portion The state quantity is: $x_1=i_a$, $x_2=e_a$, where $e_a$ is the disturbance term, and is denoted by an extended state $x_2$. Considering that $e_a$ remains constant during an update period of current, so let $\dot{x}_2=0$. State space equation at electrical portion is then obtained:

$$\begin{cases} \dot{x}_1 = (-R_a x_1 - x_2 + u_a)/L_a \\ \dot{x}_2 = 0 \end{cases}$$

Set $z_1=\hat{i}_a$, $z_2=\hat{e}_a$, then state equation of the extended state observer becomes:

$$\begin{cases} \dot{z}_1 = [-\hat{R}_a z_1 - z_2 + u^*_a + \beta_1(x_1 - z_1)]/\hat{L}_a \\ \dot{z}_2 = \beta_2(x_1 - z_1) \end{cases},$$

Where $\beta_1$ and $\beta_2$ are coefficients of the observer. In order to ensure $z_1 \to i_a$, $z_2 \to e_a$, $\beta_1$ and $\beta_2$ should satisfy following formula:

$\lambda(s)=|sI-(A-LC)|=(s+\omega_{01})^2;$ then:

$$\begin{cases} \beta_1 = 2\omega_{01} L_a - R_a \\ \beta_2 = -\omega_{01}^2 L_a \end{cases}$$

Where $\omega_{01}$ is a desired cutoff frequency of current loop, usually $\omega_{01}=1000\sim5000$ rad/s.

3.2 Design of the Extended State Observer (ESO2) for Estimating the Total Disturbance Including Load Torque Disturbance at Mechanical Portion Select state variables: $x_3=\omega_r$, $x_4=T_L$, where $T_L$ is a disturbance term, and is denoted by extended state $x_4$. Considering that $T_L$ remains constant during an update period of current, then $\dot{x}_4=0$. State space equation at mechanical portion becomes:

$$\begin{cases} \dot{x}_3 = (-Bx_3 - K_T i_a^* - x_4)/L_a \\ \dot{x}_4 = 0 \end{cases}$$

Set $z_3 = \hat{w}_r$, $z_4 = T_L$, then state equation of the extended state observer is:

$$\begin{cases} \dot{z}_3 = [-\hat{R}_a z_3 + K_T i_a^* - z_4 + \beta_3(x_3 - z_4)]/\hat{J} \\ \dot{z}_4 = \beta_2(x_3 - z_3) \end{cases}$$

Where $\beta_1$ and $\beta_3$ are coefficients of the observer. In order to ensure $z_3 \rightarrow \omega_r$, $z_4 \rightarrow T_L$, $\beta_a$ and $\beta_4$ should satisfy following formula:

$$\lambda(s) = |sI - (A-LC)| = (s+\omega_{02})^2;$$

then:

$$\begin{cases} \beta_3 = 2\omega_{02}J - B \\ \beta_4 = -\omega_{02}^2 J \end{cases}$$

Where $\omega_{02}$ is a desired cutoff frequency of speed loop, usually $\omega_{01} = 100 \sim 1000$ rad/s.

(4) Simulation and Experimental Results

In order to verify effectiveness of the proposed scheme, the applicant made a prototype. The prototype adopte a permanent magnet brushed DC motor to construct a speed servo control system of a wire-feeding machine for MIG/MAG gas arc welding equipment. The servo system supplies power to the permanent magnet motor by means of a DC/DC converter with H-bridge topology. Speed is detected by an encoder installed on motor shaft, which provides 60 pulses per revolution (60 ppr). Parameters of the prototype are shown in Table 1.

Figure 4A:
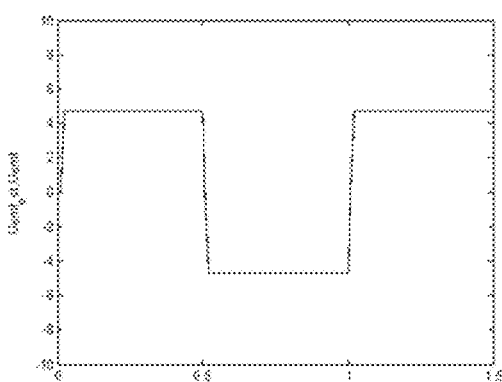
FIG. 4(a) is simulation results of actual waveform and estimated waveform of CEMF when Ra=0.22Ω according to the present invention.
Figure 4B:
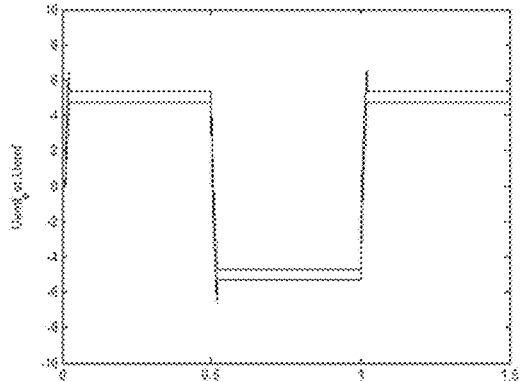
FIG. 4(b) is simulation result of actual waveform and estimated waveform of CEMF when Ra=0Ω according to the present invention.
Figure 5A:
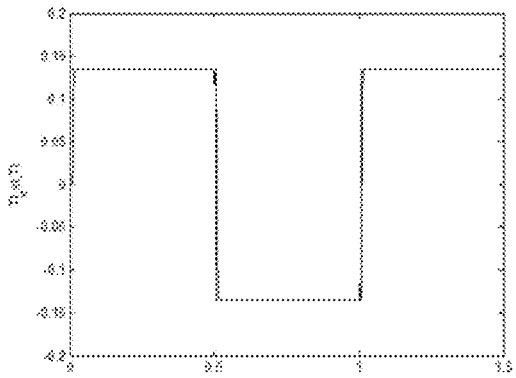
FIG. 5(a) is simulation result of actual waveform and estimated waveform of load torque when B=0.0001 according to the present invention.
Figure 5B:
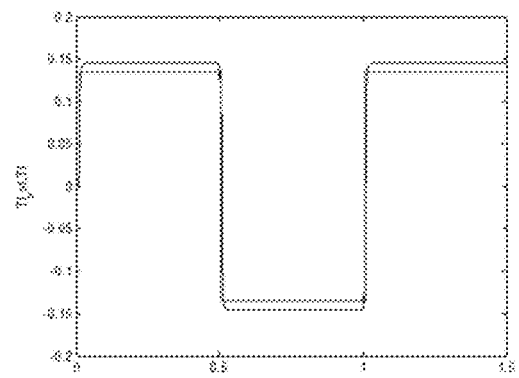
FIG. 5 (b) is simulation result of actual waveform and estimated waveform of load torque when B=0 according to the present invention.
Figure 6:
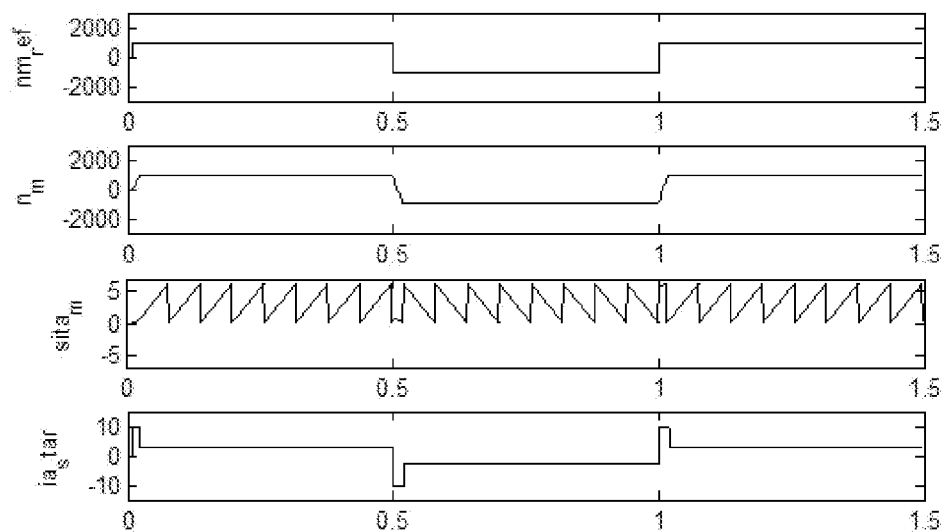
FIG. 6 is simulation result of given speed and response characteristics, rotor positions and current reference values according to the present invention.
Figure 7:
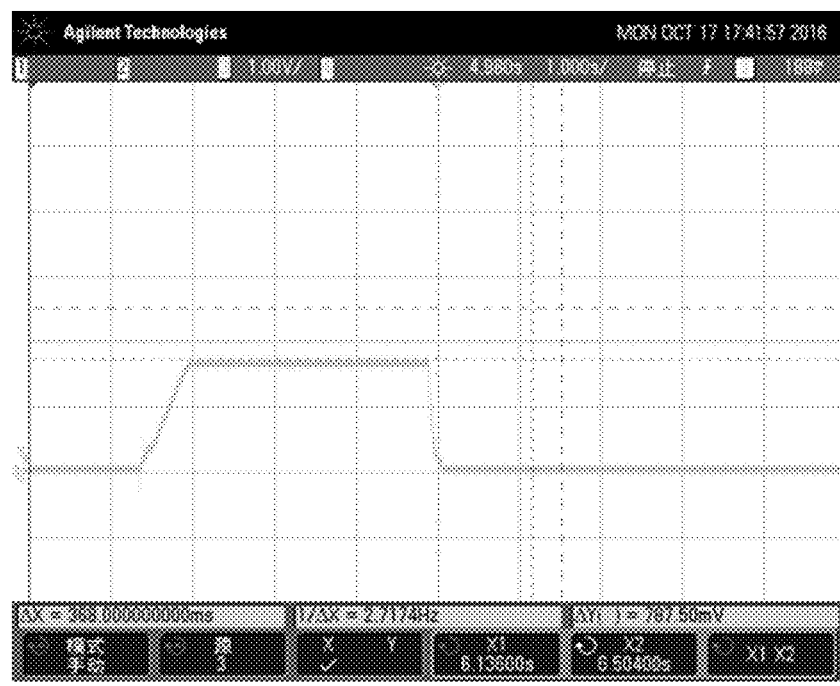
FIG. 7 is experimental result of speed response when a given wire feed speed at intermittent wire feed mode is 10 m/s according to the present invention.

FIGS. 4 to 6 show some simulation results of the prototype, in order to illustrate effectiveness of the proposed invention. Among them, FIG. 4 shows the estimated CEMF disturbance by means of the extended state observer when the armature winding resistance fluctuates in a large scope. FIG. 5 gives the estimated load torque disturbance by means of the extended state observer when the stick-slip damping coefficient varies within a large range. FIG. 6 shows the dynamic and steady-state response during four-quadrant operation of the system after the proposed scheme is utilized.

Figure 8:
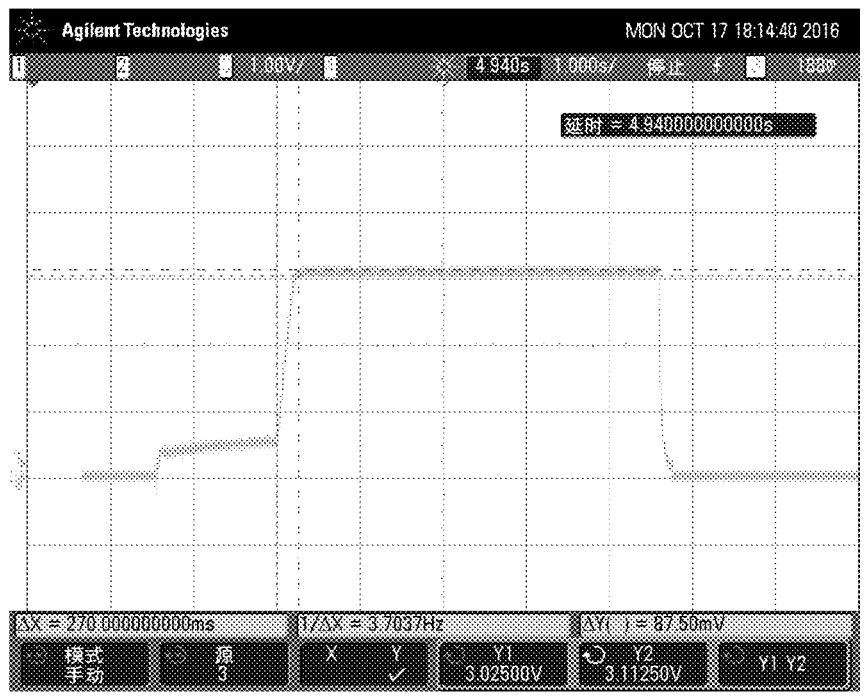
FIG. 8 is experimental result of speed response at low wire feed speed of 3 m/s and a given normal wire feed speed of 20 m/s at switching wire feed mode according to the present invention.
Figure 9:
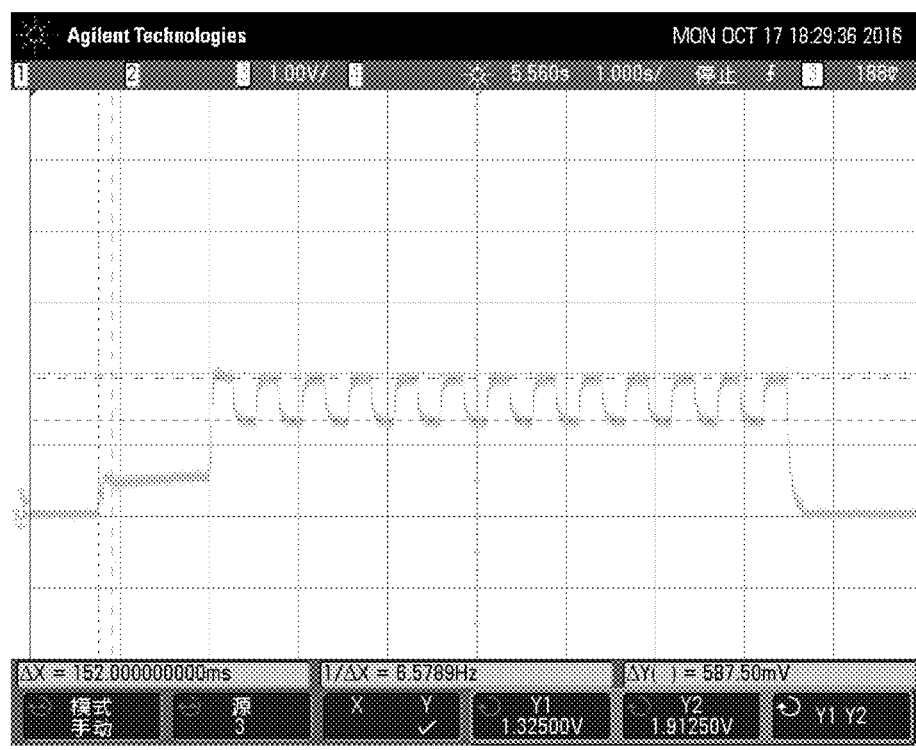
FIG. 9 is experimental result of speed response at low wire feed speed of 3 m/s, a given normal wire feed speed of 10 m/s, double pulses of 2 Hz and with an offset of 2 m/s at pulsated wire feed mode according to the present invention.

FIG. 8 and FIG. 9 are the typical experimental results when the proposed schemes are utilized for servo system of a wire-feeding machine for MIG/MAG gas arc welding equipment. FIG. 8 shows speed response when the machine operates at intermittent mode. Whereas FIG. 9 represents speed response while the machine operates at switching mode. FIG. 10 gives us speed response of the machine operating at pulsated wire feed mode.

TABLE 1

Relevant parameters of the prototype for simulation and experiments

| Rated values | | Structural parameters | | Parameters of PI controllers for inner and outer loop | | Parameters for extended state observers (ESO1\ESO2) | |
|---|---|---|---|---|---|---|---|
| $P_N$ | 80 W | $L_a$ | 0.43 mH | $K_{pw}$ | 8 | $\beta_1$ | 1.844 |
| $I_N$ | 3.8 A | $R_a$ | 0.22 Ω | $K_{iw}$ | 0.4 | $\beta_2$ | −2476.8 |
| $U_N$ | 24 V | $K_E$ | 0.0047 V/rpm | $K_{pC}$ | 300 | $\beta_3$ | 0.065 |
| $n_N$ | 5016 rpm | $K_T$ | 0.0468 Nm/A | $K_{iC}$ | 3.2 | $\beta_4$ | −26 |
| Udc | 50 V | J | 0.0001625 kg·m$^2$ | | | $\omega_{01}$ | 2400 (1/s) |
| | | B | 0.00001 Nm·s | | | $\omega_{02}$ | 800 (1/s) |

In summary, the present invention proposes a new observer-based servo control scheme according to the conventional cascade control structure. The scheme can quickly eliminate the CEMF disturbance for different speeds, at electrical (i.e., winding) portion within the inner loop, and at the same time, eliminate the load torque disturbance caused by such factors as load torque and load torque variations at mechanical portion within the outer loop.

(1) Different from conventional single disturbance-rejection scheme, the present invention separates the electrical disturbance including CEMF at electrical portion from the mechanical disturbance including load torque at mechanical portion, and adopts a cascade control structure for eliminating electrical disturbance at the inner loop and mechanical disturbance at the outer loop. In combination with two extended state observers for CEMF and load torque disturbances, a servo control strategy is realized for the first time for simultaneously eliminating the inner loop disturbance including CEMF at different speed and the outer loop disturbance including the load torque and its variation.

(2) Performance of servo control system using the proposed control algorithm is robustness to all variations of motor parameters including winding resistance (due to temperature), inductance (due to saturation) rotational inertia and stick-slip damping coefficient.

(3) Servo control system using the proposed control algorithm has strong robustness to large disturbances such as CEMF and load torque fluctuation.

(4) The system also has certain robustness to non-linear factors such as unmodeled dynamics including dynamic or/and static friction.

According to the aforementioned control scheme, a prototype is designed and manufactured. Simulation and experimental results of the prototype show that the proposed scheme is universal, and it is suitable for both DC servo and various field-oriented AC servo systems. The present invention totally improves the dynamic and steady-state performance of existing servo system, and can also solve problems resulting from perturbation of electrical and mechanical parameters, grid voltage fluctuation and load changes. So far, the aforementioned scheme has been successfully applied to the servo system of a wire-feeding machine for MIG/MAG gas arc welding equipment.

Although the present invention are described by means of a specific illustration in combination with accompanying drawings, the protection scope of the present invention is not limited to this illustration. It should be understood by those skilled in the art that various modifications or variations could be made by those skilled in the art based on the technical solution of the present invention without any creative effort, and these modifications or variations should fall into the protection scope of the present invention.

The invention claimed is:

1. A servo control method for simultaneously eliminating counter electromagnetic force (CEMF) disturbance and load torque disturbance in a drive system, comprising:
adopting different disturbance estimation methods for CEMF disturbance and load torque disturbance; and
simultaneously eliminating the CEMF disturbance and the load torque disturbances including:
eliminating the CEMF disturbance for different speeds of a rotor of the drive system at an electrical portion through an inner loop of a cascade structure; and
eliminating the load torque disturbance caused by a load and load changes at a mechanical portion through an outer loop of the cascade structure,
wherein the CEMF disturbance at the electrical portion and the torque disturbance at the mechanical portion lie in different time scales,
wherein:
eliminating CEMF disturbance at the electrical portion includes building a state space model of armature winding of an armature of the drive system including the CEMF disturbance, establishing an extended state space model describing the electrical portion using the state space model of armature winding in combination with features of the CEMF disturbance, constructing a first extended state observer for estimating the CEMF disturbance using the extended state space model of the electrical portion and nominal values of parameters of the armature winding, and obtaining, by the first extended state observer, all electrical disturbances including the CEMF disturbance using voltage applied to two endpoints of the armature winding, an actual armature current, and a nominal model of the armature winding; and
eliminating the torque disturbance at the mechanical portion includes building a state space model of the drive system, establishing an extended state space model describing the mechanical portion using the state space model of the drive system in combination with features of the load torque disturbance, constructing a second extended state observer for estimating the load torque disturbance using the extended state space model of the mechanical portion and nominal values of parameters of the drive system, and obtaining, by the second extended state observer, information of all mechanical disturbances including the load torque disturbance using applied armature current, rotor speed from an encoder or a rotary resolver of the drive system, and a nominal model of the drive system.

2. The servo control method for simultaneously eliminating CEMF disturbance and load torque disturbance according to claim 1, wherein the inner loop is established from a detected current and the first extended state observer; in the inner loop, current is regulated with a feedback control; and the CEMF disturbance is eliminated by feed-forward control.

3. The servo control method for simultaneously eliminating CEMF disturbance and load torque disturbance according to claim 1, wherein deviation of a given current from actual armature current is sent to a current regulator; and output of the current regulator is added to the CEMF disturbance estimated by the first extended state observer to provide a given armature voltage.

4. The servo control method for simultaneously eliminating CEMF disturbance and load torque disturbance according to claim 3, wherein the current regulator is an anti-integral saturation PI type controller, and a remained part of the CEMF disturbance is eliminated using of the PI type controller.

5. The servo control method for simultaneously eliminating CEMF disturbance and load torque disturbance according to claim 1, wherein the outer loop is established from a detected rotor speed and the second extended state observer; in the outer loop, rotor speed is regulated with a feedback control; and the load torque disturbance is eliminated by feed-forward control.

6. The servo control method for simultaneously eliminating CEMF disturbance and load torque disturbance according to claim 5, wherein deviation of a given speed from an actual speed is sent to a speed regulator; and output of the speed regulator is added to an equivalent current converted from the load torque disturbance estimated by the second extended state observer to provide given armature current.

7. A servo control system capable of simultaneously eliminating influence of counter electromagnetic force (CEMF) disturbance and influence of load torque disturbance in a drive system, comprising:
a cascade structure that includes an inner loop and an outer loop,
wherein the inner loop includes a current regulator and a first extended state observer; the first extended state observer estimates total CEMF disturbance at an electrical portion based on a nominal value model of a armature winding of an armature of the drive system using voltage applied to two endpoints of the armature and an actual armature current; and the first extended state observer performs feed-forward compensation in combination with the current regulator to eliminate the total CEMF disturbance;
the outer loop includes a speed regulator and a second extended state observer; the second extended state observer estimates total torque disturbance at a mechanical portion based on a nominal value model of the drive system using measured armature current and an actual speed of a rotor of the drive system; and the second extended state observer performs feed-forward compensation in combination with the speed regulator to eliminate the total load torque disturbance;
wherein the cascade structure controls the inner loop and the outer loop to simultaneously eliminate the CEMF disturbance and the load torque disturbance.

8. The control system according to claim 7, wherein the nominal value model of the armature winding is obtained from nominal values of armature inductance and resistance; and
the nominal value model of the drive system is obtained from nominal values of total inertia and stick-slip damping coefficient of the drive system.

9. The control system according to claim 7, wherein control parameters of the first extended state observer are determined according to desired cutoff frequency of current loop, armature inductance and resistance; and
control parameters of the second extended state observer are determined according to the desired cutoff frequency of speed loop, total inertia and stick-slip damping coefficient of the drive system.

* * * * *